United States Patent [19]

Baetke

[11] Patent Number: 4,646,993

[45] Date of Patent: Mar. 3, 1987

[54] SIDEWALL VENT VALVES FOR A CONVERTIBLE COMPARTMENT AIRCRAFT

[75] Inventor: Russell E. Baetke, Seattle, Wash.

[73] Assignee: The Boeing Company, Seattle, Wash.

[21] Appl. No.: 707,558

[22] Filed: Mar. 4, 1985

[51] Int. Cl.[4] .............................................. B64D 13/00

[52] U.S. Cl. ............................ 244/117 R; 244/129.2; 244/118.5; 98/1.5

[58] Field of Search ............... 244/118.5, 129.1, 129.2, 244/129.4, 117 R; 98/1.5, 102, 106; 169/49, 62

[56] References Cited

U.S. PATENT DOCUMENTS

| | | | |
|---|---|---|---|
| 2,129,826 | 9/1938 | Dintilhac | 169/49 |
| 3,308,742 | 3/1967 | Veber | 98/106 |
| 4,057,205 | 11/1977 | Vensel | 244/118.5 |
| 4,552,325 | 11/1985 | Bruensicke | 244/129.2 |

*Primary Examiner*—Trygve M. Blix
*Assistant Examiner*—Rodney Corl
*Attorney, Agent, or Firm*—Christensen, O'Connor, Johnson & Kindness

[57] ABSTRACT

Sidewall vent valves for aircraft having one or more above deck compartments (29) designed to be convertible between passenger and cargo configurations is disclosed. The sidewall vent valves (52, 91 or 121) are located in the deck (27) of the aircraft between the skin (25) of the aircraft fuselage and the sidewall panels (37) of the convertible compartment. The sidewall vent valves (51, 92 or 121) are opened and closed by an electrical actuator that is common to several valves. In the open position holes in the deck are uncovered to allow air to flow from the convertible compartment (29) to the below deck cargo compartment (31) of the aircraft. In the closed position such air flow is prevented. The sidewall vent valves may be reciprocal (121) or rotary (51,91) and, preferably, include membranes (107, 127, 133) designed to "blowout" in the event of an explosive decompression in the below deck cargo compartment (31).

16 Claims, 10 Drawing Figures

Fig. 7.
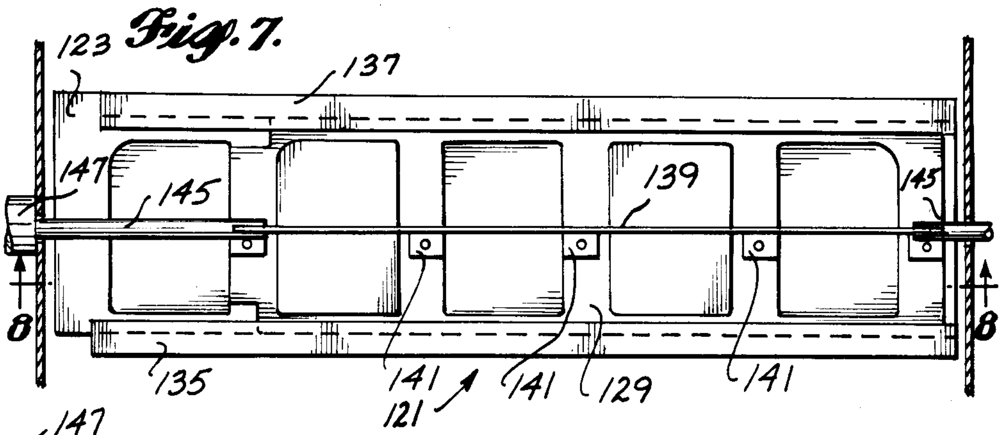
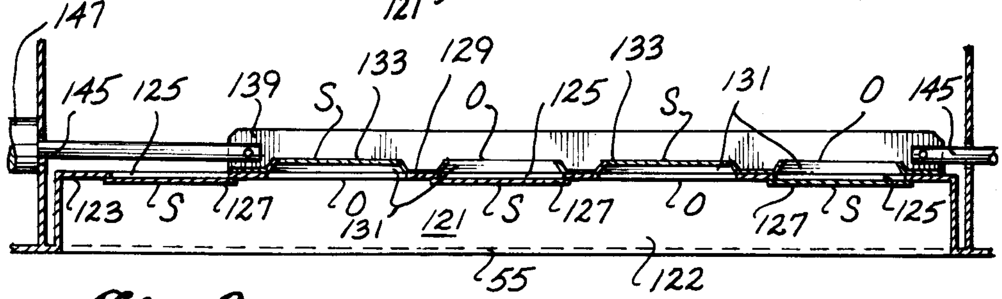
Fig. 8.
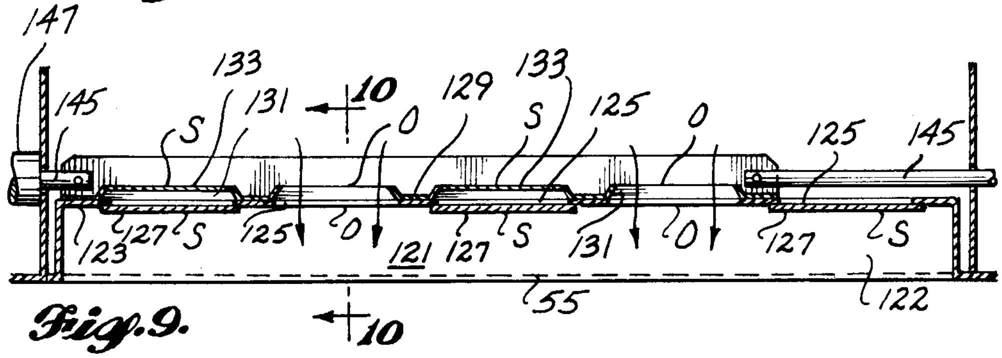
Fig. 9.
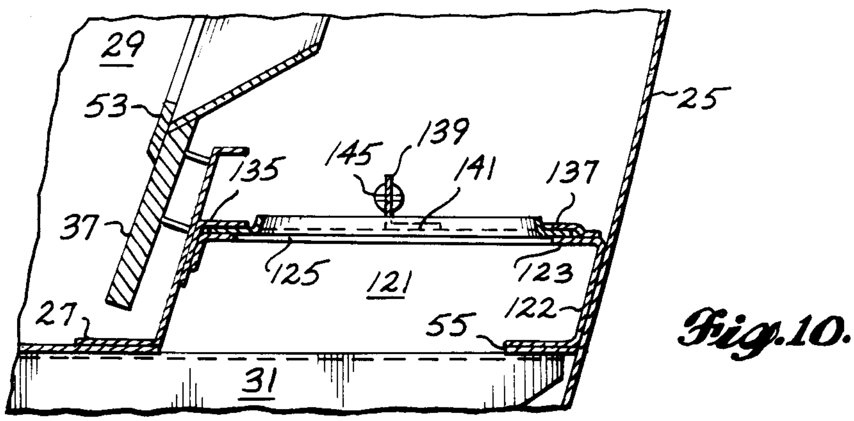
Fig. 10.

SIDEWALL VENT VALVES FOR A CONVERTIBLE COMPARTMENT AIRCRAFT

TECHNICAL AREA

This invention is directed to commercial aircraft having a compartment that is designed to be convertible between passenger and cargo configurations and, more particularly, valves for controlling the air outflow from such compartments.

BACKGROUND OF THE INVENTION

In order to increase the versatility of aircraft, proposals have been made to produce combi-aircraft, i.e., aircraft with one or more upper deck compartments that can be converted between passenger and cargo configurations. In order to accomplish this result, upper deck compartment(s) must be designed so that both passenger and cargo compartment requirements are met. One requirement of cargo compartments is that such compartments include a state of the art apparatus for extinguishing a fire in the compartment. State of the art cargo compartment fire extinguishing apparatus releases an inert gas, i.e., halogen, when a fire occurs. This requirement causes some difficulties in an upper deck cargo compartment due to the way aircraft airflow systems are designed. More specifically, in modern commercial aircraft pressurized air enters passenger compartments at the ceiling and exits via floor vents. Many "floor" vents are located at the base of the sidewall panels used to decorate the interior of the aircraft. After passing through the sidewall panels, the exiting air flows through holes formed in the aircraft deck, between the sidewall panels and the skin of the aircraft, into the cargo compartment located beneath the deck of the aircraft. Since pressure in the below deck cargo compartment is less than the pressure in the passenger compartment, normally, air always flows in this direction, i.e., from the above deck passenger compartment to the below deck cargo compartment. Air flows from the cargo compartment into the atmosphere outside the aircraft.

Merely adding an inert gas fire extinguishing system to a convertible compartment with the airflow path described above would create an ineffective system. Such a system would lose inert gas because the inert gas used in such systems, i.e., halogen, is heavier than air and sinks. Since the pressure differential between above deck passenger compartments and below deck cargo compartment pulls air from the bottom of the passenger compartment, the heavier halogen gas would rapidly be pulled from the convertible compartment to the cargo compartment. Such a dissipation of the inert (e.g., halogen) gas would either substantially decrease the effectiveness of the inert gas fire extinguishing system or require that the inert gas fire extinguishing system include substantially more gas than the minimum needed to extinguish a fire in the convertible compartment.

One suggested approach to alleviating the foregoing difficulty is to seal the sidewall panels (which are normally attached in a nonsealed manner) to their support structure and add a sealing dam between the sidewall panels and the skin of the aircraft, above the panel vents. In addition, a multitude of auxiliary valves, one associated with the vents in each panel were proposed. Since each valve was independently actuated, in order to convert the compartment from its normal (e.g., passenger) configuration to its cargo configuration, the individual actuation of a large number of valves (30 to 40) was required. In order to be absolutely certain that all valves were closed when the compartment was in its cargo configuration, the status of each valve was required to be individually determined. In addition, the closing of all of the sidewall vents resulted in a requirement that each panel be modified to have a blowout capability in the event of an explosive decompression in the cargo compartment. Because this approach requires an extensive modification of the sidewalls it is undesirably complex and expensive. Further, this approach is inherently unreliable due to the large number of valves that must be manually examined.

The present invention is directed to providing sidewall vent valves for convertible compartments located in the upper deck of an aircraft that avoid the foregoing difficulties.

SUMMARY OF THE INVENTION

In accordance with this invention, sidewall vent valves for an aircraft having one or more above deck compartments designed to be convertible between a passenger configuration and a cargo configuration is provided. The sidewall vent valves are located in the deck of the aircraft between the skin of the aircraft fuselage and the sidewall panels of the convertible compartment. The sidewall vent valves are opened and closed by an electrical actuator that is common to several valves. In the open position, holes in the deck are uncovered to allow normal flow from the convertible compartment to the below deck cargo compartment of the aircraft. In the closed position air flow through the deck holes is prevented.

In accordance with further aspects of this invention, the closure member of the sidewall vent valves is rotationally moved between open and closed positions and the electrical actuator is a rotary actuator, such as an electric motor. In accordance with alternative principles of this invention, the closure member is reciprocally moved between open and closed positions and the electrical actuator is a reciprocal actuator, such as a linear actuator.

In accordance will still futher principles of this invention, the closure member of the vent valve is formed such that at least a portion of the member can be blownout in the event of an explosive decompression in the cargo compartment when the closure member is in its closed position.

As will be readily appreciated from the foregoing description, the invention provides a new and improved way of sealing a convertible compartment located above the deck of an aircraft to prevent air from flowing from the convertible compartment to the below deck cargo compartment of the aircraft via the sidewalls. By locating the valves in the deck or floor of the compartment, in the region between the skin of the aircraft fuselage and the compartment sidewall panels, the need to seal the sidewall panels is elminated. Further, because the valves are collectively actuated, the chance of any valve not being closed when the compartment is in the cargo configuration is substantially reduced, if not entirely eliminated.

While the valves are designed to be in either a fully open or a fully closed position, it will be appreciated that this is necessitated by the pressure differential that normally exists between an above deck passenger compartment converted to a cargo compartment, and a below deck cargo compartment. If an aircraft is designed such that no pressure differential exists, it may be desirable under some circumstances to provide intermediate valve shutter positions, which can be readily accomplished by controlling the electrical actuators so that they move the valve closure members to desired intermediate shutter positions.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 7 is a plan view illustrating another alternative embodiment of a sidewall vent valve formed in accordance with the invention;

FIG. 8 is a cross-sectional view taken along line 8—8 of FIG. 7 showing the valve in the closed position;

FIG. 9 is a cross-sectional view along line 8—8 of FIG. 7 showing the valve in the open position; and, FIG. 10 is an enlarged cross-sectional view taken along line 10—10 of FIG. 9.

DESCRIPTION OF THE PREFERRED EMBODIMENTS

Figure 1:
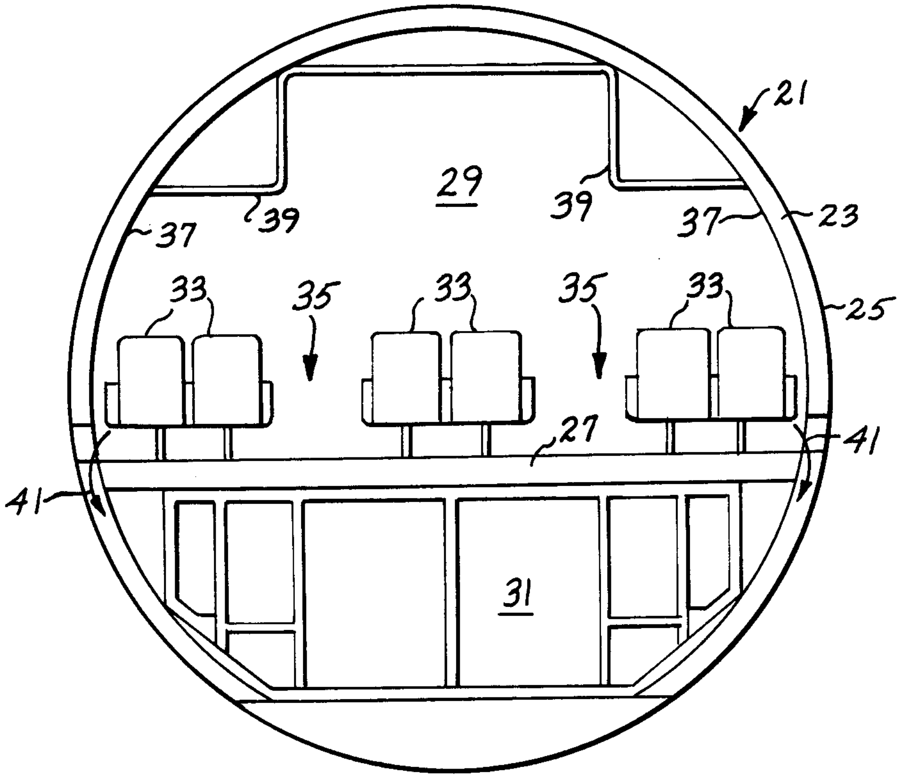
FIG. 1 is a cross-sectional view of a fuselage of a commercial aircraft and shows the flow of air from an above deck passenger compartment to a below deck cargo compartment via the sidewalls of the aircraft.

FIG. 1 is a schematic, cross-sectional view of the fuselage 21 of an aircraft. The fuselage 21 includes frame members 23, which, along with other structural members, e.g., stringers (not shown), support an outer skin 25. The frame members 23, along with other structural support members, also support a floor 27 located below the mid-point of the fuselage 21. A passenger compartment or compartments 29 of the aircraft are located above the deck 27 and a cargo compartment 31 is located beneath the deck 27. The deck 27 supports passenger seats 33, which are normally located on either side of one or more aisles 35.

The frames 23 and stringers are covered in the passenger compartment by sidewall panels 37 that extend upwardly from the deck 27 on either side of the outer most seats 33, terminating where the panels meet luggage racks 39, which form a portion of the ceiling of the passenger compartment 29.

Pressurized fresh air is directed to the cabin by ducts (not shown) located in the ceiling of the passenger compartment 29. Air flows from the passenger compartment 29 to the cargo compartment 31 via holes formed in the deck 27. Undirectional airflow from the passenger compartment 29 to the cargo compartment 31 occurs because the pressure in the cargo compartment 31 is lower than the pressure in the passenger compartment 29. Air flows from the cargo compartment 31 to the atmosphere, which is at a pressure lower than the pressure in the cargo compartment.

Depending upon the type of aircraft, some or all of the air flow between the above deck passenger compartments 29 and the below deck cargo compartment 31 occurs through vents located at the base of the sidewall panels 37. The vent holes are covered by a grill or in some other manner hidden from the view of the aircraft's passengers. After passing through the sidewall vents, air passes through holes located in the deck 27, between the sidewall panels 37 and the skin 25 of the aircraft fuselage 21. The just described sidewall airflow paths are illustrated by arrows 41 located on either side of the fuselage 21 shown in FIG. 1.

The present invention is directed to providing an apparatus for controlling the just described sidewall air flow paths so that the passenger compartment 29 can be converted into a useable cargo compartment, i.e., a cargo compartment that can be adequately protected using conventional inert gas fire extinguishing systems. Obviously, changes other than those herein described are needed to convert a passenger compartment to a cargo compartment. For example, the seats 33 must be removed. Such other changes are not described since they do not form part of this invention.

As noted above, regions of an aircraft designed to carry cargo, such as the cargo compartment 31 located below the deck 27 of an aircraft normally contain some form of fire extinguishing system. Modern aircraft cargo compartment fire extinguishing systems include a source of inert gas, such as halogen, which is released when a fire is sensed. Because halogen is heavier than air, it sinks in an air atmosphere. As a result, the mere addition of a fire extinguishing system of this type to a convertible passenger compartment 29 of the type illustrated in FIG. 1 would result in the halogen gas leaving the compartment 29 via flow paths 41. In order to compensate for this loss a larger than normal amount of halogen gas would be required so that the amount lost could be replenished. Obviously, this is undesirable. The invention is directed to eliminating this requirement by providing valves for controlling airflow along the paths represented by the arrows 41. Specifically, the invention provides vent valves for controlling the passage of air and other gases from the above convertible passenger compartment 29 to the below deck cargo compartment 31 via the sidewall holes located in the aircraft deck 27. This result is achieved without requiring that the convertible compartment sidewall panels 37 be sealed to the frame members 23 and the other structural members. Further this invention achieves this result in a reliable manner that avoids the need for a manual inspection of a large number of valves.

Figure 2:
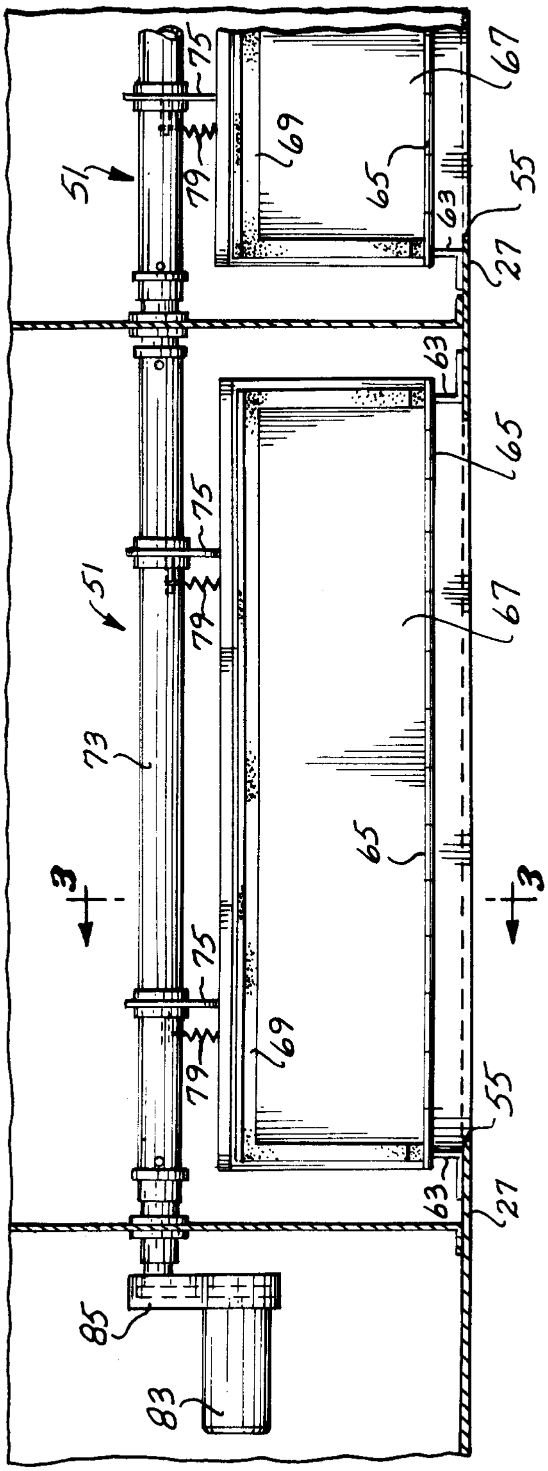
FIG. 2 is a plan view illustrating one embodiment of a sidewall vent valve formed in accordance with the invention.
Figure 4:
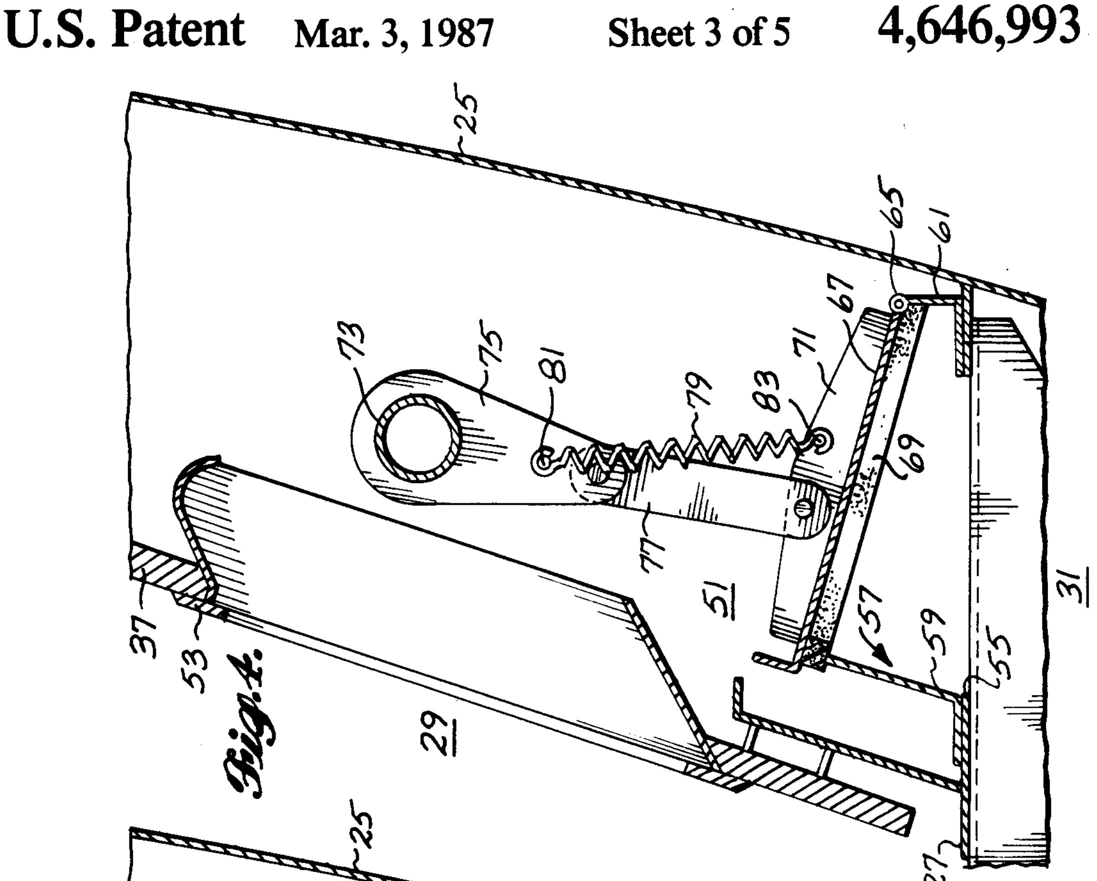
FIG. 4 is a cross-sectional view along line 3—3 of FIG. 2 showing the valve in the closed position.
Figure 3:
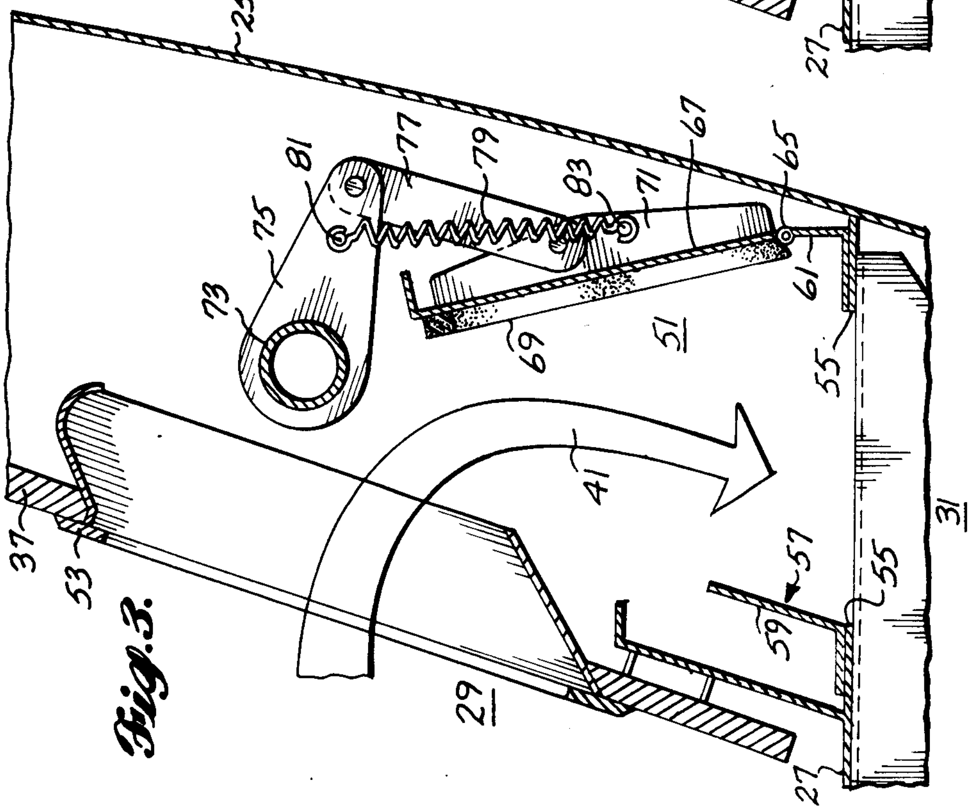
FIG. 3 is a cross-sectional view along line 3—3 of FIG. 2 showing the valve in the open position.

FIGS. 2, 3 and 4 illustrate a first embodiment of a sidewall vent valve 51 formed in accordance with the invention. The sidewall vent valve 51 is located between the skin 25 and the sidewall panels 37 and is designed to open or close the airflow path 41 between the above deck passenger compartment 29 and the below deck cargo compartment 31 of the aircraft. As previously indicated, this airflow path 41 includes a hole in the sidewall panels 37 located near the base of the panels that is normally covered by a grill 53. After passing through the grill 53, each airflow path 41 passes through one or more holes 55 formed in the deck 27 of the aircraft between the frames 23, and between the skin 25 and the sidewall panels 37.

The sidewall vent valve 51 illustrated in FIGS. 2–4 comprises a frame 57 surrounding the holes 55 formed in the deck 27. When viewed from above the frame 57 has a rectangular shape that includes front and rear walls 59 and 61 (FIGS. 3 and 4) and sidewalls 63 (FIG. 2). In the illustrated embodiment of the invention, the front wall 59 is higher than the rear wall 61 and the sidewalls taper accordingly. Attached via a hinge 65 to the rear wall 61 is a plate 67. The plate 67 forms a closure member or valve shutter and is sized to close the entire opening defined by the frame 57. Attached to the lower surface of the plate 67 is a gasket 69. The gasket 69 is formed and positioned to impinge the upper edge of the front wall 59 and the sidewalls 63 of the frame 57 when the plate 67 is in the valve closed position illustrated in FIG. 4.

Since the holes 55 are relatively long and narrow, the plate 67 is relatively long and narrow. Mounted atop the plate 67, near either end thereof, is an upwardly extending flange 71. The flanges 71 are affixed to the plate 67 by any suitable attachment media such as rivets, welding, bolts, etc. Mounted above the opening 55 is a shaft 73. Mounted on the shaft 73, in alignment with each of the flanges 71, is a crank arm 75. The outer end of each crank arm 75 is pinned to one end of a link 77. The other end of each link 77 is pinned to its underlying flange 71. As a result, when the shaft 73 is rotated, the link arms pull and push the plate 67 between valve open and closed positions.

An off center spring 79, designed to apply a holding pressure to the plate 67 when the plate is in the valve open and closed positions is also included in the sidewall vent valve illustrated in FIGS. 2–4. The off center spring 79 is a coil spring connected between a first pin 81, mounted on the crank arm 75 between the shaft 73 and the point where the crank arm 75 is pinned to the link 77, and a second pin 83 positioned on the flange 71, outboard of the point where the link 77 is pinned to the flange 71.

As illustrated in FIG. 2, preferably, the shaft 73 is common to several sidewall vent valves 51. As also illustrated in FIG. 2, the shaft 73 is operated by an electric motor 83 connected to the shaft 73 via a reduction gear box 85. Since the shaft 73 is common to a plurality of sidewall vent valves 51, when the motor 83 is actuated to rotate the shaft 73, a plurality of sidewall vent valves 51 are simultaneously opened and closed. Thus, the need to separately operate and individually check the position of a plurality of valves is avoided.

Figure 6:
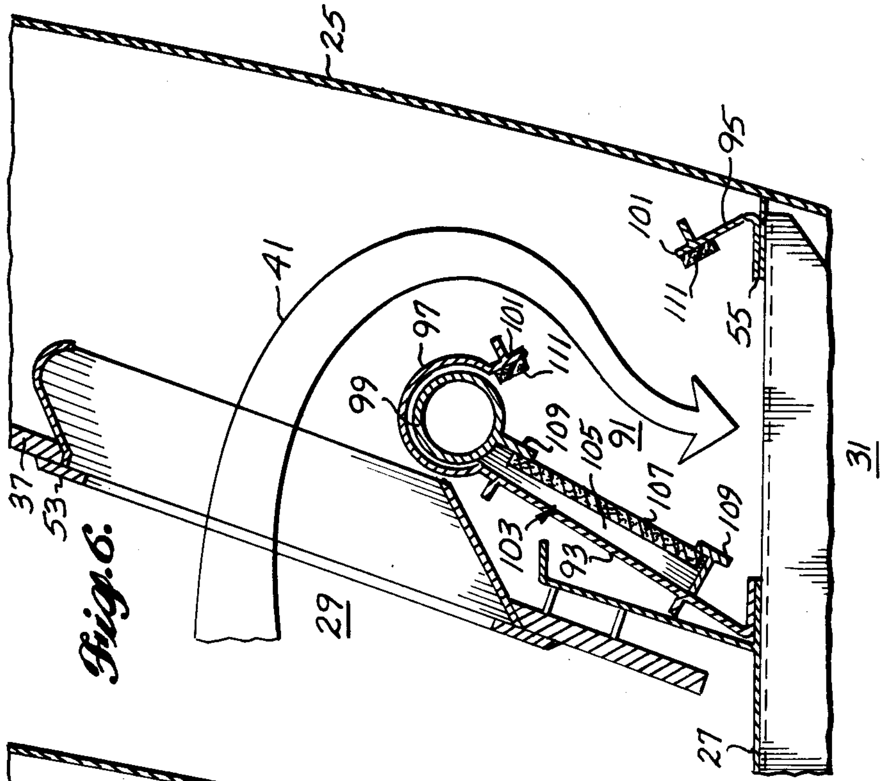
FIG. 6 is a cross-sectional view of the valve illustrated in FIG. 5 showing the valve in the open position.
Figure 5:
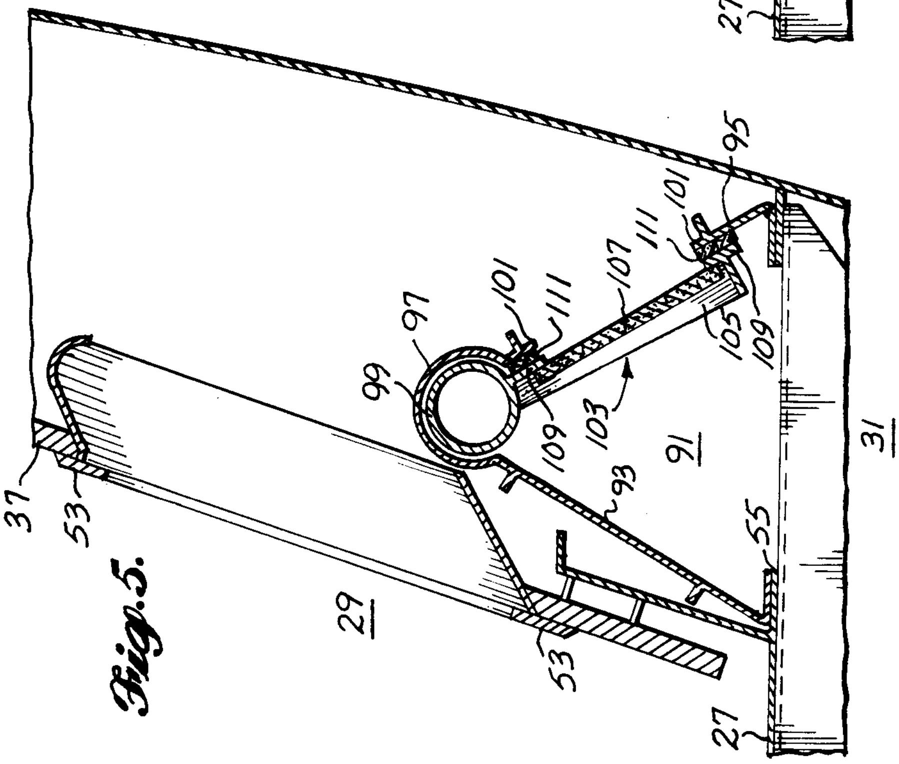
FIG. 5 is a cross-sectional view of an alternative embodiment of a sidewall vent valve formed in accordance with the invention showing the valve in the closed position.

FIGS. 5 and 6 illustrate an alternative embodiment of a sidewall vent valve 91 formed in accordance with the invention. The sidewall vent valve 91 illustrated in FIGS. 5 and 6 comprises front and rear walls 93 and 95 extending upwardly from the holes 55 in the floor 27. The front and rear walls 93 and 95 converge toward one another and terminate at a circular shroud 97 that surround a shaft 99. The front wall 93 is solid and the rear wall 95 includes one or more openings 101. The ends (not shown) of the front and rear walls 93 and 95 are enclosed by solid sidewalls.

Mounted on the shaft 99 is a valve shutter 103. The valve shutter 103 comprises a downwardly extending blade sized to close the hole 101 in the rear wall 95. More specifically, the valve shutter 103 includes a frame 105 that defines an aperture filled by a solid membrane 107. The frame 105 includes surrounding flanges 109 positioned to impinge on magnetic closure elements 111 that surround the opening 101 in the rear wall 95. More specifically, the frame flanges 109 are formed of a ferromagnetic metal that is attracted by the magnetic closure elements 111 that surround the opening 101 in the rear wall 95. As a result, a tight magnetic seal is created when the shutter 103 is moved to the closed position illustrated in FIG. 5. In this position the shutter 103 closes the opening 101 in the rear wall 95.

In the open position (FIG. 6), the shutter 103 is moved against the front wall 93. As a result air can flow from the convertible passenger compartment 29 through the grill 53 mounted in the sidewall panel 57 to the opening 55 formed in the floor 27.

The membrane 107 provides blowout protection. More specifically, if a rapid decompression occurs in the cargo compartment 31 when the valve shutter 103 is in its closed position (FIG. 5), the resulting pressure differential will blowout the membrane 107. In this way structural damage resulting from an explosive decompression is minimized, if not entirely avoided.

The shaft 99 is rotated by a rotary electric actuator, which may take the form illustrated in FIG. 2 and heretofore described. Further, preferably, the shaft 99 is connected to a plurality of sidewall vent valves 91. As a result, energization of the electrical actuator results in the simultaneous opening (or closing) of a plurality of sidewall vent valves.

FIGS. 7–10 illustrate a further alternative embodiment of a sidewall vent valve formed in accordance with the invention. The sidewall vent valve 121 illustrated in FIGS. 7–10 comprises a frame 122 surrounding each of the holes 55 formed in the deck 27 of the aircraft between the skin 15 and the sidewall panels 37. The frame 122 includes an apertured flat top 123. The flat top 123 of the embodiment of the sidewall vent valves illustrated in FIGS. 7–10 includes five rectangular apertures 125 arrayed side-by-side in a row. The odd numbered ones (1-3-5) of the apertures 125 are each closed by a sealing membrane 127. The even numbered ones (2-4) are open. Normally, the sealing membranes 127 prevent the flow of air through their related apertures 125. The sealing membranes are designed such that an explosive decompression in the below deck cargo compartment 31 creates a pressure differential across the membranes that either disentegrates the membranes or tears them away from their related apertures 125.

Mounted on the flat top 123 of the frame 121 is an apertured plate 129. The apertured plate includes four rectangular apertures 131 arrayed side-by-side in a row. The apertures 131 in the apertured plate 129 are sized the same as the apertures 125 in the flat top 123. The odd numbered ones (1-3 from the left as viewed in FIGS. 7–9) of the plate apertures 131 are closed by sealing membranes 133 similar to the sealing membranes that close the odd numbered apertures in the flat top 123. The even numbered ones (2-4) of the plate apertures 131 are open.

The apertured plate 129 is slidably held in front and rear tracks 135 and 137 that overlie the flat top, along the front and rear edges thereof. Overlying the apertured plate 129 is an elongate bar 139. The elongate bar 139 is attached to the apertured plate 129 via flanges 141 extending outwardly from the bar. The flanges overlie the regions of the apertured plate 129 located between the plate apertures 131. The legs 141 are attached to the apertured plate by rivets, welding or some other suitable attachment medium.

Extending outwardly from either end of the elongate bar 139 is a shaft 145. The shafts 145 connect the apertured plates 129 of adjacent sidewall vent valves together. The shaft located at the end of a series of sidewall vent valves is connected to and moved by the movable element of a suitable reciprocating electrical actuator, such as a linear actuator 147.

In operation, the apertured plate 129 is slidable between a position (FIG. 9) whereat the closed apertures of the apertured plate are aligned with the open apertures of the flat top 123 of the frame 121 and a position (FIG. 8) whereat the closed apertures in the apertured plate (i.e., the apertures covered with the sealing membranes 133) are alignable with the open apertures of the flat top 123 of the frame 121. When the apertured plate is in the former position the aligned open apertures provide a flow path between the above deck convertible compartment 29 and the below deck cargo compartment 31. When the slidale plate is in the latter position, the sealed apertures of the flat top 123 are aligned with the open apertures in the apertured plate 129 and the open apertures of the flat top are aligned with the sealed apertures in the apertured plate. As a result, a sealing membrane is aligned with each of the open apertures. Thus, all of the apertures are closed or sealed. Hence, air flow between the convertible compartment 29 and the cargo compartment 31 is prevented. In the case of an explosive decompression the sealing membranes 127 and 133 are blown away to open the air flow path covered by the membranes.

As will be readily appreciated from the foregoing description, the invention provides sidewall vent valves for controlling the flow of air and other gases from a convertible compartment located above the deck of an aircraft to the below deck cargo compartment of the aircraft. When the convertible compartment is being used as a passenger compartment, the closure elements or shutters of the sidewall vent valves are moved to a position (open) that allows air to flow from the passenger compartment to the cargo bay. Contrariwise, when the convertible compartment is being used as a cargo compartment, the sidewall vent valves are moved to a position (closed) that prevents air from flowing from the above deck cargo compartment to the below deck cargo compartment. While the primary purpose of the invention is to provide a vent valve that is movable between two extreme positions (open and closed), obviously, if desired, a vent valve formed in accordance with the invention could be used to control the amount of air flow through the valve openings by placing the valve closure element in an intermediate position. Further, a control system could be provided to cause the closure of the valves only if a fire is sensed in the convertible compartment, avoiding the need to maintain the valves closed when the compartment is being used to carry cargo.

While preferred embodiments of the invention have been illustrated and described, it will be appreciated that various changes can be made herein without departing from the spirit and scope of the invention. For example, while explosive decompression protection has been provided by membranes, it is to be understood that mechanical blowout panels could be used in place of membranes. Similarly, while five (5) flat top apertures and four (4) apertured plate apertures have been described in connection with the FIGS. 7-10 embodiment of the invention it is to be understood that a greater or lesser number of apertures can be used. Consequently, it is to be understood that the invention can be practiced otherwise than as specifically described herein.

The embodiments of the invention in which an exclusive property or privilege is claimed are defined as follows:

1. In an aircraft having a deck that separates an above deck compartment convertible between passenger and cargo carrying configurations from a below deck compartment, said aircraft including a skin and sidewall panels, said sidewall panels located on the sides of said above deck compartment and spaced inwardly from said skin, said aircraft including holes in said deck in the region between said skin and said sidewall panels, the improvement comprising:

sidewall vent valves mounted in said aircraft between said skin and said sidewall panels adjacent to said deck holes for controlling the passage of air and other gases through said deck holes, said sidewall vent valves including:

(i) closure means movable between open and closed positions, when in said open position said closure means allowing air and other gases to pass through said deck holes, when in said closed position said closure means preventing air and other gases from passing through said deck holes; and, (ii) electrical actuator means coupled to said closure means for moving said closure means between said open and closed positions.

2. The improvement claimed in claim 1 wherein said electrical actuator means is coupled to a plurality of closure means for simultaneously moving said plurality of closure means between said open and closed positions.

3. The improvement claimed in claim 1 wherein:

each of said closure means includes: (i) a frame having a plurality of walls surrounding one of said deck holes and defining an open top; and (ii) a plate hinged to one of said walls; and, said electrical actuator means is coupled to said plate to move said plate between: (i) a position whereat said plate impinges on the walls that define the open top of said frame and, thus, close off said open top and prevent air and other gases from passing through said deck holes; and, (ii) a position spaced from the walls that define the open top of said frame and, thus, open up said open top and allow air and other gases to pass through said deck holes.

4. The improvement claimed in claim 3 wherein said electrical actuator means is coupled to the plates of a plurality of closure means for simultaneously moving said plurality of plates between said position whereat said plates impinge on said walls of said frame and said position whereat said plates are spaced from said walls of said frame.

5. The improvement claimed in claim 4 wherein said electrical actuator means includes:

a shaft lying above said plurality of plates;

a plurality of off center crank means for connecting said shaft to the plates of said plurality of closure means; and, an electrically powered rotary actuator coupled to said shaft for rotating said shaft between positions whereat said plates impinge on the walls of their respective frames and positions whereat said plates are spaced from the walls of their respective frames.

6. The improvement claimed in claim 1 wherein:

each of said closure means includes: (i) a pair of walls lying on opposite sides of a related deck hole, said walls converging toward one another, one of said walls being solid and the other being apertured; and, (ii) a shutter movable between a position whereat said shutter lies adjacent said apertured wall and prevents the passage of air and gases through the aperture in said apertured wall and a position whereat said shutter lies adjacent said solid wall and allows air and other gases to pass through the aperture in said apertured wall; and, said electrical actuator means is coupled to said shutter to move said shutter between said position whereat said shutter lies adjacent said apertured wall and said position whereat said shutter lies adjacent said solid wall.

7. The improvement claimed in claim 6 wherein said electrical actuator means is coupled to a plurality of shutters to simultaneously move said plurality of shutters between said position whereat said shutters lie adjacent their respective apertured wall and said position whereat said shutters lie adjacent their respective solid wall.

8. The improvement claimed in claim 7 wherein said electrical actuator means includes:

a shaft lying above said plurality of shutters; and, an electrically powered rotary actuator coupled to said shaft to rotate said shaft.

9. The improvement claimed in claim 6 wherein each of said shutters is formed by a frame surrounding an aperture and wherein said aperture in said frame of said shutter is closed by a blowout membrane, said blowout membrane providing blowout protection by being demolished and, thus, open the aperture in said shutter frame in the event a pressure differential of predetermined magnitude occurs across said blowout membrane.

10. The improvement claimed in claim 9 wherein said electrical actuator means is coupled to a plurality of shutters to simultaneously move said plurality of shutters between said position whereat said shutters lie adjacent their respective apertured wall and said position whereat said shutters lie adjacent their respective solid wall.

11. The improvement claimed in claim 10 wherein said electrical actuator means includes:

a shaft lying above said plurality of shutters; and, an electrically powered rotary actuator couple to said shaft to rotate said shaft.

12. The improvement claimed in claim 1 wherein:

each of said closure means comprises: (i) a frame surrounding a related deck hole, said frame having a flat top, said flat top including a plurality of side-by-side open apertures; and, (ii) a slidable plate overlying said flat top, said slidable plate including a plurality of side-by-side open apertures sized and shaped similar to the size and shape of the apertures in said flat top, said slidable plate movable between a position whereat the open apertures in said slidable plate are aligned with the open apertures in said flat top and a position whereat the open apertures in said slidable plate are out of alignment with the open apertures in said flat top and are covered by the regions of said flat top lying between said open apertures in said flat top; and, electrical actuator means coupled to said slidable plate for moving said slidable plate between said position whereat the open apertures in said slidable plate are aligned with the open apertures in said flat top and said position whereat the open apertures in said slidable plate are out of alignment with the open apertures in said flat top.

13. The improvement claimed in claim 12 wherein said electrical actuator means is coupled to a plurality of slidable plates for simultaneously moving said plurality of slidable plates between said positions whereat the open apertures in said slidable plate are aligned with the open apertures in said flat top and said position whereat the open apertures in said slidable plate are out of alignment with the open apertures in said flat top.

14. The improvement claimed in claim 12 including:

a plurality of closed apertures formed in said slidable plate inter spaced between said plurality of open apertures, each of said closed apertures closed by a blowout membrane;

a plurality of closed apertures formed in said flat top inter spaced between said plurality of open apertures, each of said closed apertures closed by a blowout membrane;

said closed apertures in said slidable plate being aligned with said open apertures in said flat top and said closed apertures in said flat top being aligned with said open apertures in said slidable plate when said slidable plate is in said position whereat the open apertures in said slidable plate are out of alignment with said open apertures in said flat top; and, said blowout membranes providing blowout protection by being demolished and, thus, open the closed apertures in said flat top and said slidable plate in the event a pressure differential of predetermined magnitude occurs across said blowout membranes.

15. The improvement claimed in claim 14 wherein said electrical actuator means is coupled to a plurality of slidable plates for simultaneously moving said plurality of slidable plates between said positions whereat the open apertures in said slidable plate are aligned with the open apertures in said flat top and said position whereat the open apertures in said slidable plate are out of alignment with the open apertures in said flat top.

16. The improvement claimed in claim 15 wherein said electrical actuator means includes:

a shaft means lying above said plurality of slidable plates;

connecting means for connecting said shaft to said plurality of slidable plates; and, an electrically powered linear actuator coupled to said shaft means for moving said shaft means and, thus, said plurality of slidable plates between said position whereat the open apertures in said slidable plate are aligned with the open apertures in said flat top and said position whereat the open apertures in said slidable plate are out of alignment with the open apertures in said flat top.

* * * * *